United States Patent [19]

Kitahara

[11] Patent Number: 4,819,023

[45] Date of Patent: Apr. 4, 1989

[54] AUTOMATIC DOCUMENT FEEDER FOR AUTOMATICALLY FEEDING A PLURALITY OF STACKS OF ORIGINALS

[75] Inventor: Makoto Kitahara, Tokyo, Japan

[73] Assignee: Canon Kabushiki Kaisha, Tokyo, Japan

[21] Appl. No.: 28,732

[22] Filed: Mar. 23, 1987

[30] Foreign Application Priority Data

Mar. 24, 1986 [JP] Japan ................... 61-065051

[51] Int. Cl.$^4$ ........................................ G03G 15/00
[52] U.S. Cl. ................... 355/14 SH; 355/23; 271/3.1
[58] Field of Search ............ 355/3 SH, 14 SH, 23, 355/24, 75, 6; 271/3.1, 4, 9, 186, 303, 265

[56] References Cited

U.S. PATENT DOCUMENTS

| | | |
|---|---|---|
| Re. 23,641 | 4/1953 | Andren . |
| 4,126,390 | 11/1978 | Connin . |
| 4,157,822 | 6/1979 | Miller . |
| 4,176,945 | 12/1979 | Holzhauser et al. . |
| 4,231,561 | 11/1980 | Kaneko et al. ............ 271/4 X |
| 4,248,528 | 2/1981 | Sahay ...................... 355/6 X |
| 4,264,067 | 4/1981 | Adams et al. ............ 355/3 SH X |
| 4,295,733 | 10/1981 | Janssen et al. . |
| 4,319,833 | 3/1982 | Hidding . |
| 4,330,197 | 5/1982 | Smith et al. . |
| 4,419,007 | 12/1983 | Kingsley . |
| 4,456,236 | 6/1984 | Buddendock . |
| 4,523,752 | 6/1985 | Kigawa et al. ............ 355/14 SH |
| 4,544,148 | 10/1985 | Kitajima et al. .......... 271/186 X |
| 4,579,325 | 4/1986 | Pinckney et al. ......... 279/9 X |
| 4,602,776 | 6/1986 | York et al. . |
| 4,609,283 | 9/1986 | Murata et al. . |
| 4,621,921 | 11/1986 | Takahata et al. ......... 355/14 SH |
| 4,727,398 | 2/1988 | Honjo et al. ............. 355/3 SH |
| 4,769,674 | 9/1988 | Kitajima et al. .......... 355/14 SH |

FOREIGN PATENT DOCUMENTS 2928197 1/1980 Fed. Rep. of Germany .
3630384 4/1987 Fed. Rep. of Germany .

Primary Examiner—Arthur T. Grimley
Assistant Examiner—J. Pendegrass
Attorney, Agent, or Firm—Fitzpatrick, Cella, Harper & Scinto

[57] ABSTRACT

An automatic document feeder includes a reserved original feeding station including first stacking device for stacking originals, a first feeder for feeding one by one the originals stacked on the first stacking device, a first conveyor for conveying, without inversion in facing orientation, to a processing station the originals fed by the first feeder and a tray for receiving the original discharged from the processing station. Also provided is a type original feeding station including a second stacking device for stacking the originals, a second feeder for feeding one by one the originals stacked on the second stacking device, a second conveyer for conveying to the processing station the original fed by the second feeder, an inverting mechanism for receiving the original from the processing station, inverting the original in its facing orientation and conveying the original to the processing station and returning device for returning the original to the second stacking device, and a controller for controlling the reversed original feeding station and the circulation type original feeding station to feed an unprocessed original from the reserved original feeding station to the processing station after inverting it by the inverting mechanism.

10 Claims, 9 Drawing Sheets

AUTOMATIC DOCUMENT FEEDER FOR AUTOMATICALLY FEEDING A PLURALITY OF STACKS OF ORIGINALS

FIELD OF THE INVENTION AND RELATED ART

The present invention relates to an automatic document feeder usable with an image forming apparatus such as a copying machine.

A copying machine equipped with an automatic document feeder is known. However, when one person is making a copy using the document feeder, the next persons are not able to use the copying machine and have to line-up waiting for their turns. This is very inefficient. Therefore, a proposal has been made wherein while one set of originals are being copied, a next set of original can be set in a document feeder; and as soon as the previous set of the documents have been copied, the next set of the originals are processed for copying as if the next set of the originals are reserved.

For example, U.S. Pat. No. 4,248,529 discloses an automatic document feeder provided with a plurality of original stacking trays for stacking plural originals, an original feeding roller for feeding out the originals one-by-one from the stacking trays, copying means for producing a copy from the original fed out by said original feeding roller, control means for sequentially feeding the original out of the original stacking trays so as to feed out the originals from another stacking tray which has been reserved, after the last original is fed out from the first original stacking tray, and original receiving tray for identifying the originals which have been copied and for receiving them.

Japanese Laid-Open Patent Application No. 54-121136 discloses a copying machine equipped with a mechanism for automatically feeding the originals to an image exposure station, wherein after one set of originals have all been fed out of an original stacking tray, and before a next set of originals are fed out, an electrical signal is produced to change a copying condition or conditions.

An original fed out of an original stacking tray is introduced onto a platen glass for supporting an original while it is being copied, and is conveyed to another end of the platen glass, wherein the original is inverted in its facing orientation by a U-turn guide; and then the original is conveyed from the other side to a predetermined position on the platen glass by a conveying belt. After an image of the original is read, it is discharged to the one side of the platen glass, where it is received by a receiving tray.

In this structure, however, it is not possible to recycle an original, with the result that a plurality of sets copies can not be produced from the same originals in the correct page order (in this case, a sorting mechanism is required).

SUMMARY OF THE INVENTION

Accordingly, it is a principal object of the present invention to provide an automatic document feeder by which one or more sets of originals are set in one original stacking tray, and the set or sets of originals are automatically and continuously processed for copying the conditions required for the set or sets, and this can be repeated plural times. Here, "set of originals" means a set of originals which are to be processed under the same copying conditions.

It is another object of the present invention to provide an automatic document feeder whereby the page order of the originals set in an original stacking tray is maintained after they are discharged onto an original discharge tray, in a reserved original feeding operation.

According to an embodiment of the present invention, there is provided an automatic document feeder comprising stacking means for stacking an original, feeding means for feeding one by one the originals stacked on the stacking means, an introducing passage for introducing the original fed by the feeding means, without inversion in its facing orientation, to a processing station, means for receiving an original discharged from the processing station, wherein the stacking means, the feeding means, the introducing passage and the receiving means constitute a first original feeding station A; and recycle feeding means for recyclably feeding the original to the processing station, and to a reversing passage for reversing and inverting the unprocessed original fed from the first original feeding station A to the processing station, wherein the recycle means and the reversing passage constitute an original feeding station B.

According to this structure, plural sets of originals are set in the original stacking means; are automatically and continuously processed under the processing conditions required for the respective sets of originals; and are discharged to the original receiving means, whereby plural sets of originals are efficiently processed.

Further, the originals may be separated one by one from the bottom of the stack, and therefore, while one set of the originals are being processed, an additional set of originals can be placed on the top of the stack on the original stacking tray, whereby the processing operation becomes more efficient.

Additionally, the originals can be fed in a recycling manner, and therefore, a plurality of sets of copies can be produced from the same set of originals in correct page order.

Furthermore, the structure of the original feeding station A is simplified, because it is not required that the original feeding station is capable of inverting the originals. In the embodiment, the originals can be inversed by another original feeding station, that is, the feeding station B, while the original feeding station A is capable of stacking one or more reserved set of originals.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Referring to FIGS. 1-7, there is illustrated an automatic document feeder according to an embodiment of the present invention.

Figure 1:
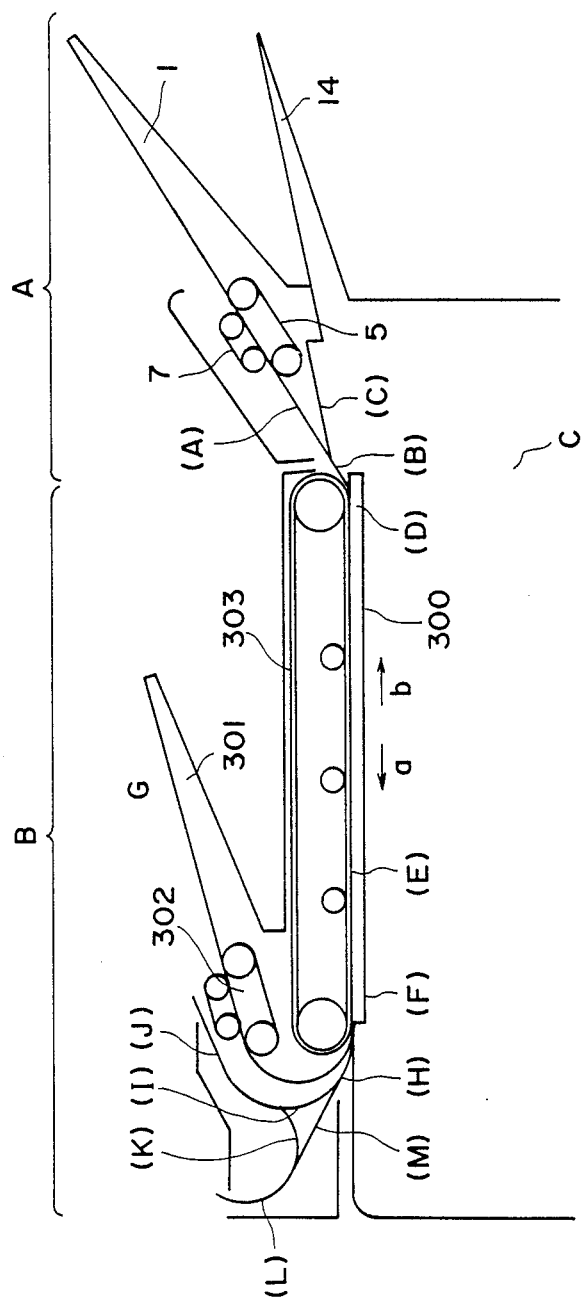
FIG. 1 is a schematic sectional view of an automatic document feeder according to an embodiment of the present invention.

FIG. 1 schematically illustrates original feeding stations and original passages. The automatic document feeder comprises an original feeding station or a reserved original setting station A and a circulation type document feeding station B. Between those stations, an image processing station C is disposed. The original feeding station B includes a first original passage (G), a second original passage including passages (H), (I) and (J), a third original passage including passages (K) and (L) and a fourth original passage (M). The reserved original setting station A includes a fifth original passage including passages (A) and (B) and a sixth original passage (C).

First a the description will be provided with respect to the reserved original setting station A including the fifth and sixth original passages, referring to FIG. 2; then the circulation type document feeding station will be described, referring mainly to FIG. 8; and then the operation of this embodiment will be described, referring back to FIG. 1.

Figure 2:
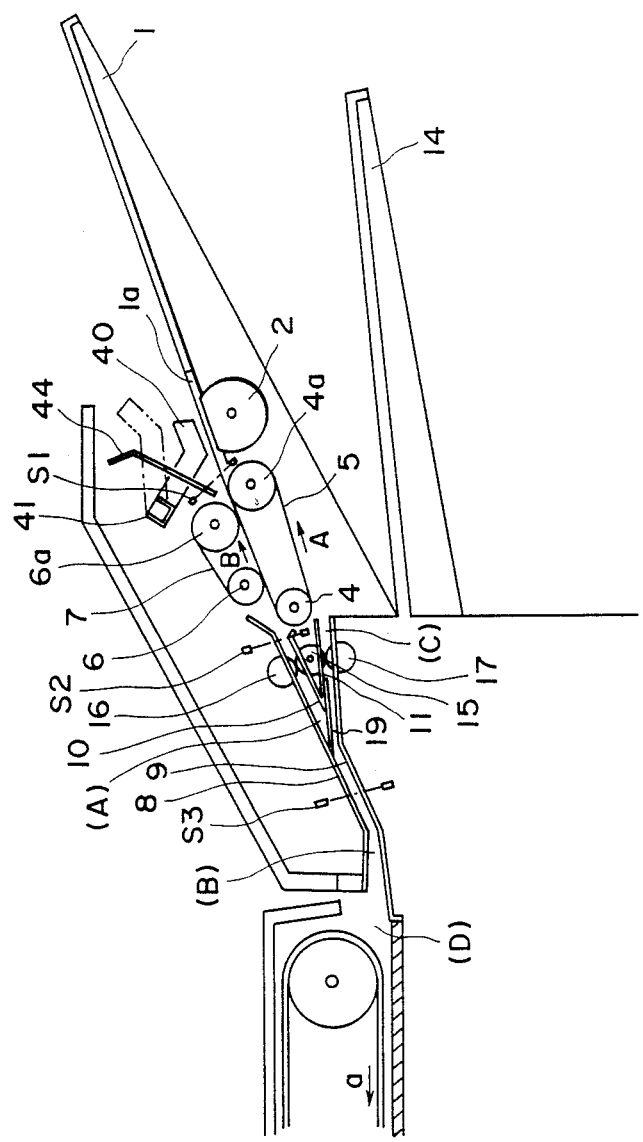
FIG. 2 is a sectional view of an original feeding station A of FIG. 1.

As shown in FIG. 2, the station A comprises a stacking tray (a second stacking portion) for stacking originals to be processed or copied, more particularly in this embodiment. The stacking tray 1 is inclined downwardly toward an original feeding side, whereby the stacked originals are aligned at the original feeding side. The original setting station A includes a crescent roller 2 for feeding an original to a downstream separating station. The crescent roller 2 is controlled so that the cut-away portion thereof faces substantially upwardly when there is no original on the stacking tray 1. Feeding rollers 4 and 4a serve to rotate a feeding belt 5 in the direction indicated by an arrow A so as to feed an original on the stacking tray 1. Separation rollers 6 and 6a rotate a separation belt 7 in the direction indicated by an arrow B, which cooperates with the feeding belt 5 to separate the bottommost original from the stack of the originals on the tray 1 to single it out. The feeding belt 5 and the separation belt 7 constitute a separation and feeding station S (a second separating means).

The above-mentioned fifth sheet passage includes a passage (A) formed by guiding plates 8 and 10 therebetween and a passage (B) formed by guiding plates 8 and 9 therebetween. The fifth passage is effective to guide the original singled out by the separating and feeding station S to a second inlet (D).

The sixth original passage (C) is formed by guiding plates 9 and 11 therebetween and is branched out from the fifth sheet passage in a switching-back manner. The sixth passage is effective to direct the original coming from the passage (B) to an original discharge tray 14, which is provided below an extension of the sixth sheet passage (C) to receive originals which have been processed.

Additional feeding rollers 15, 16 and 17 are provided to feed originals, wherein rollers 15 and 16 are effective to convey the original in the fifth sheet passage, while rollers 15 and 17 are effective to convey the original in the sixth passage.

A deflector 19 made of flexible material is attached to the guide 11 at its one end, and its free end contacts to the guide plate 8. The original passing through the original passage (A) pushes the deflector aside by its leading end and can pass by the deflector. On the other hand, the original fed through the passage (B) from the left side in FIG. 2 is introduced to the passage (C) with certainty. The deflector 19 may be a sheet of Mylar or thin stainless steel. A first original or sheet sensor S1 disposed adjacent a leading side of the stacking tray 1 to detect the presence or absence of an original on the stacking tray 1. A second sheet sensor S2 is disposed in the middle of the passage (A) of the fifth passage between the separating and feeding station S and feeding rollers 15 and 16. A third sheet sensor S3 is disposed in the middle of the passage (B) of the fifth passage. The second and third sheet sensors S2 and S3 function to detect a leading or trailing edge of the sheet or original. The second sheet sensor S2 also functions to lead a partition sheet between adjacent sets of originals, which will be described in detail hereinafter.

A weight 40 is disposed above a through hole 1a of the original stack 1 and is swingable about a pin 41. The weight 40 is normally urged to an upper position by a spring 42 (FIG. 4) as shown by broken lines in FIGS. 2 and 4. When energized by an electromagnetic device 43, the weight 40 rotates about the pin 41 against the spring 42 down onto a top surface of the topmost of the stacked originals at a position corresponding to the crescent roller 2, thus pushing the stacked sheets under the proper pressure. The pressure exerted by the weight 40 to the stacked sheets is effective to stabilize and assure the sheet feeding from the bottom of the stacked sheets to the station S by the crescent roller 2.

Figure 5:
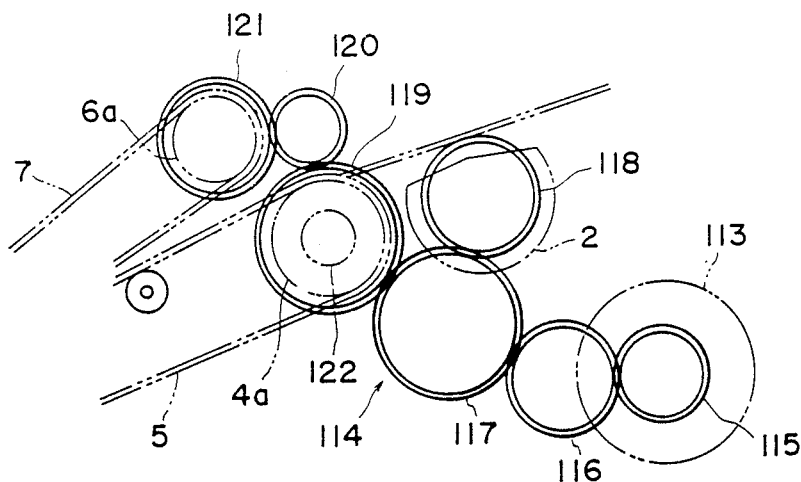
FIG. 5 is a front view of a driving system for a separating mechanism.

Referring to FIG. 5, a driving system for the separating and feeding station S will be described. The driving system 114 includes a gear train, which comprises a gear 115 fixedly mounted to an output shaft of a driving motor 113, an intermediate gear 116 meshed with the gear 115, and a gear 117 meshed with the intermediate gear 116. The gear 117 is meshed with a gear 118 fixedly mounted to a shaft of the crescent roller 2 and with a gear 119 for driving a driving pulley 4a of the feeding belt 5. The gear 119 is operatively connected through an intermediate gear 120 with a gear 112 fixed to a shaft of a driving pulley 6a of the separating belt 7.

The gear 119 and the driving pulley 4a for the feeding belt 5 are connected through a known one way clutch 112 so as to allow a reversed movement in the counterclockwise direction.

Figure 3:
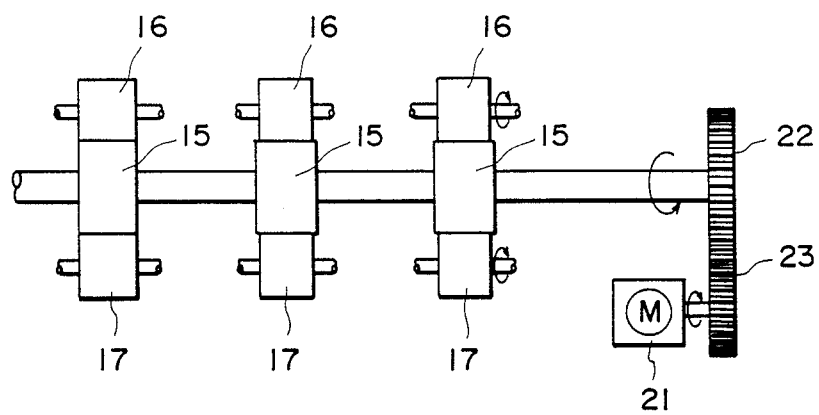
FIG. 3 is a side view of feeding rollers.
Figure 4:
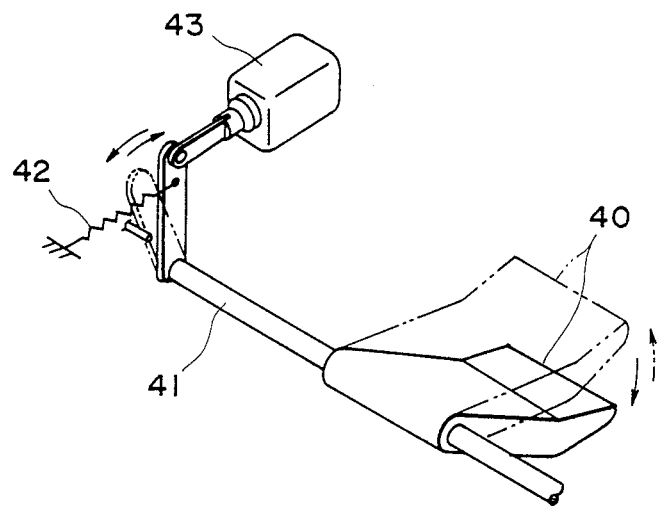
FIG. 4 is a perspective view illustrating a weight structure.

Referring to FIG. 3, a driving mechanism will be described, wherein a motor 21 is operatively connected to an extension of a shaft of the feeding roller 15 through gears 22 and 23 so as to transmit the motor driving force to the roller 15.

Figure 8:
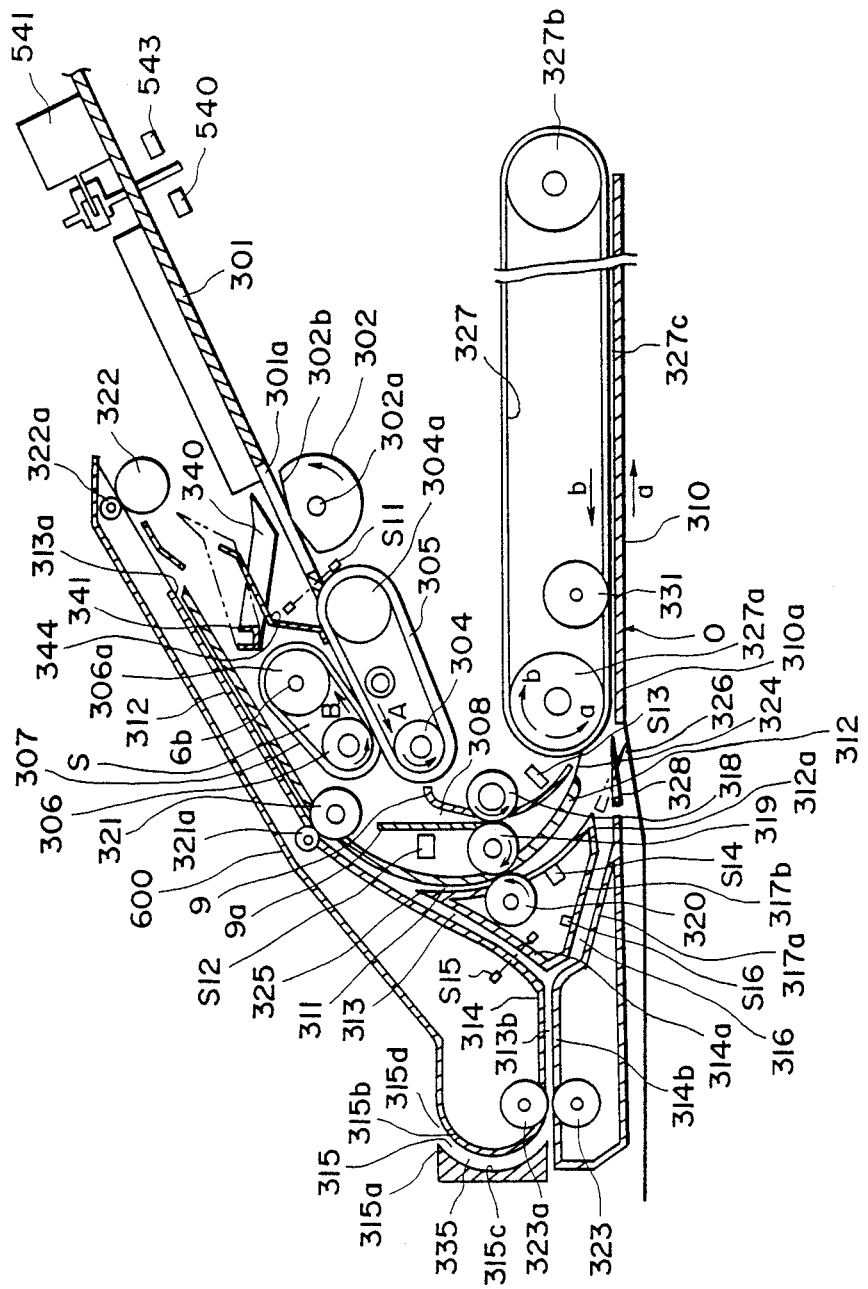
FIG. 8 is a sectional view of a feeding station B of FIG. 1.

Referring to FIG. 8, the circulation type original feeding station B will be described.

The feeding station B includes the first sheet or original passage (G), a second sheet passage including passages (H), (I) and (J), the third sheet passage including passages (K) and (L) and a fourth sheet passage (M). The feeding station B comprises a stacking tray 301 for stacking originals. The tray 301 is inclined downwardly toward an original feeding side so that the originals on the tray 301 are aligned at the original feeding side. There is provided a crescent roller 302 to feed the original to a downstream separating station. The crescent roller 302 is controlled so that its cut-away portion 302a faces substantially upwardly when there is no original on the tray 301. Feeding rollers 304 and 304a function to rotate a feeding belt 305, which corresponds to the belt 303 in FIG. 1, in a direction of an arrow A to feed the original on the tray 1. Separating rollers 306 and 306a serve to rotate a separation belt 307 in a direction indicated by an arrow B, which cooperates with the feeding belt 305 to separate the bottommost one of the original from the stacked originals. The feeding belt 305 and the separating belt 307 constitute a separating and feeding station S, which corresponds to the station indicated by a reference 302 in FIG. 1.

The first sheet passage (G), which is indicated by a reference 308 in FIG. 8 is formed by guiding plate 309 and 309a therebetween, and it serves to guide the original singled out by the separating and feeding station S onto a platen glass 310 (300 in FIG. 1). The first sheet passage 308 or (G) is arched between the separating and feeding station S and an end 310a of the platen glass 310, and therefore, is effective to invert the original fed out by the feeding belt 305 and to introduce the same onto the platen glass 310.

The second sheet passage indicated by a reference 311 in FIG. 8 (passages (H), (I) and (J) in FIG. 1) is formed by arched guides 312 and 312a therebetween and by 312 and 312b therebetween. The second sheet passage 311 guides the original from the platen glass 310 and reverses it to the stacking tray 310. The second sheet passage 311 is somewhat parallel with the first sheet passage 308 and extends from an end 310a of the platen glass 310 to above the separating belt 307 outside of the sheet passage 308.

The third sheet passage indicated by a reference 313 in FIG. 8 (passages (K) and (L)) branches from the second sheet passage 311 in a switching-back manner. The third sheet passage 313 is used to invert the original in its facing orientation. The third passage 313 is formed by guiding plates 314 and 314a therebetween and by guiding plate 314 and 314b therebetween. The latter portion 315 (passage (L) in FIG. 1) of the third passage 313 is formed by arched guide 315a and 315b, and is effective to receive the original from the passage 313 and to reverse it upwardly along the arched portion 315c. At this time, a part of the original is exposed outside the document feeder through an opening 315d. When it is thus exposed, that face of the duplex original which is going to be faced down on the platen 310, faces up, so that the information on this face can be confirmed by the operator.

The fourth sheet passage indicated by a reference 316 in FIG. 8 and by a reference (M) in FIG. 1 is branched from the third sheet passage 313 in a switching-back direction and is effective to invert a duplex original in its facing orientation. The fourth sheet passage 316 is formed by guiding plate 317 and 317a. The fourth sheet passage 316 receives the original from the third sheet passage 313 and switches it back onto the platen 310.

The feeding station B further includes feeding rollers 318, 319 and 320 for feeding the original. The feeding rollers 318 and 319 feed the original in the first sheet passage 308 to the platen glass 310. The feeding rollers 319 and 320 cooperate to feed the original in the second sheet passage 311 to the stacking or feeding tray 301. There are further provided feeding roller couples 321-321a, 322-322a and 323-323a. The roller couple 321-321a and the roller couple 322-322a serve to feed the original from the platen glass 310 toward the feeding tray 301, and then to reverse and switch back the original from the second sheet passage to the third sheet passage 313. The roller couple 323-323a functions to reverse the original from the third sheet passage 313 so as to expose a part of the original outside the document feeder by feeding it to the passage 315 and once stopping the original. The roller couple 323-323a, then reverses the original from the third sheet passage 313 to the fourth sheet passage 316. A deflector 324 made of a flexible sheet is attached to the guide 312 at one end thereof, and a free end thereof is lightly contacted or slightly spaced from the original feeding belt 327. The original passed through the first sheet passage 308 pushes aside the deflector 324 by its leading end to advance toward the platen 310. The original from the platen 310 toward the second sheet passage is sure to be introduced in the second sheet passage 311 because the free end of the deflector 324 is contacted or is close to the belt 317. At this time, a movable deflecting plate 326 takes a position indicated by chain lines so as to direct the original to the second sheet passage 311. Another deflector 325 of flexible material is attached to the guide 314a at its one end, and its free end contacts to the guide 312. The original passing through the second sheet passage 311 pushes the deflector 325 aside by its leading end so as to pass by the deflector. The original passing from the second sheet passage 311 toward the third sheet passage 313 is introduced to the third sheet passage 313 with certainty because the free end of the deflector 325 contacts to the guide 312. The movable deflecting plate 326 is disposed adjacent a left end of the platen glass 310a (FIG. 8), where the first sheet passage 308, the second sheet passage 311 and the fourth sheet passage 316 merge. The deflecting plate 326 extends parallel with a driving roller 327a of the belt 327 and is swingable about a shaft 328. The deflecting plate 326 is normally urged upwardly by a spring. The deflecting plate 326 is connected to a plunger which, upon energization, swings the deflecting plate 326 down to a position indicated by chain lines. When the deflecting plate 326 takes this position, the original introduced from the first sheet passage 308 to the platen and then returning from the platen 310 is directed, with certainty, to the second sheet passage 311. When, on the other hand, it takes the solid line position, the original is assured to be directed from the fourth sheet passage 316 to the platen 310.

The deflectors 324 and 325 are made of Mylar, a thin stainless steel sheet or another flexible sheet.

Feeding rollers 327a and 327b are reversible rollers to revolve the original feeding belt 327 which covers substantially the entire surface of the platen 310, in forward rotation to introduce the original onto the platen 310, and to discharge the original from the platen 310 by its reversed rotation. In this embodiment, the roller 327a is a driving roller, while the roller 327b is a driven roller. A roller 311 is effective to confine the belt 327 onto the top surface of the platen glass 310 so as to assure the transportation of the original by the belt 327 and also is effective to provide a sharp reproduced image.

Now, various a sensors will be explained.

A first sensor S11 is of a transparent type and is disposed adjacent a leading end of the original stacking tray 301 to detect the presence and absence of an original on the stacking tray 301. A second sensor S12 of a transparent type is disposed in the middle of the first sheet passage 308 between the separating and feeding station S and the feeding rollers 318 and 319. The third sensor S13 is disposed in the middle of the first sheet passage 308 between a left end 310a (FIG. 8) of the platen glass 310 and the feeding rollers 318 and 319. A fourth sensor S14 is disposed in the middle of the second sheet passage 311 between the left end 310a of the platen glass and the feeding rollers 319 and 320. A fifth sensor S15 is disposed in the middle of such a portion of the third sheet passage 313 which is formed by the guiding plates 314 and 314a. A sixth sensor S16 is disposed in the fourth sheet passage 316 between the left end 310a of the platen glass 310 and the feeding rollers 323 and 323a. The second, third, fourth, fifth and sixth sheet sensors S12–S16 detect the leading or trailing edge of the sheet.

A weight 340 is disposed above a through hole 301a formed in the original stacking tray 301 and is swingable about a pin 341. The weight 340 is normally urged upwardly about the pin 341 to its upper position. When, however, a plunger operatively connected to the weight is energized, the weight swings down against the spring to push the top surface of the topmost original under a proper level of pressure at a position opposed to the crescent roller 302. The pressure exerted by the weight 340 is effective to stabilize and assure transportation of the lowermost original to the separating and feeding mechanism S.

Now, operation of the document feeder according to this embodiment will be described, referring to FIG. 6 and back to FIG. 1.

Figure 6:
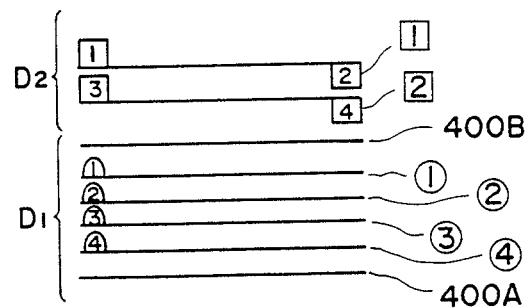
FIG. 6 is a front view of sets of stacked originals.

FIG. 6 illustrates examples of originals wherein four pages of a set D1 of simplex originals are stacked in the correct page order from the top. The pages are indicated by circled numerals in this Figure, which will be represented in this description by parenthesized "( )" numerals. Further in FIG. 6, a set D2 of duplex originals containing four pages are stacked. The duplex originals are numbered by numerals in squares, which will be represented by square-parenthesized "[]" numerals in the following description. The duplex copies are stacked in the correct page order from the top, wherein the pages are indicated by the numerals in the squares attached to the originals.

Below the bottommost originals of the respective sets D1 and D2 of the originals, partition sheets 400A and 400B are inserted. Each of the partition sheets 400A and 400B carries information representing an operating mode and/or operating condition or conditions under which the originals thereabove are to be processed, on its marking surface which is the top surface in this embodiment.

Thus, a set D1 of simplex originals is placed face up on the top marking surface of the partition sheet 400A with its first page on the top. The set D2 of duplex originals is placed on the top marking surface of the partition sheet 400B with its top page on the top. The sets D1 and D2 of the originals are placed on the tray 1 in the setting station A with the set D1 of the simplex copy at the bottom, in this example. At this setting, the sets of the originals are inserted between the tray 1 and the weight 40 sufficiently to abut the leading ends of the originals and the partition sheets to a edge limiting plate 44.

Processing a set D1 of simplex originals

1. After the originals are set in the manner described above onto the tray 1, a copy start button on an operation panel of a copying apparatus is depressed.

2. An electromagnetic device 43 (FIG. 4) is energized to swing the weight 40 down to push the stacked sheet originals.

3. The crescent roller 2 and separating and feeding mechanism S are operated to feed out the bottommost sheet of the stacked sheets, that is, the partition sheet 400A of the set D1 of the originals, and then to introduce it into the fifth sheet passage (A).

4. The partition sheet 400A introduced into the fifth sheet passage (A) is detected by the second sheet sensor S2 when its leading edge passes by the sensor S2, and then is stopped by a nip formed between the then stopped rollers 15 and 16. The rollers 15 and 16 start to rotate forwardly when a predetermined period of time T1 elapses from the instance of detection of the leading edge of the sheet 400A by the second sheet sensor S2. During this delaying period, a predetermined amount of curl is formed between the couple of rollers 15 and 16 and the separating mechanism S.

5. Upon start of the forward rotation of the couple of rollers 15 and 16, the crescent roller 2 and the separating mechanism S are stopped. Simultaneously, the energy supply to the electromagnetic device 43 is stopped so as to allow the weight 40 to move up so as to be disengaged from the top surface of the originals stacked on the tray 1. Despite the stoppage of the crescent roller 2 and the mechanism S, the partition sheet 400A is continuously introduced into the fifth passage (A) by the feeding rollers 15 and 16 rotating in the forward direction.

6. When the leading edge of the partition sheet 400A is detected by the third sheet sensor S3, a signal is produced, in response to which the belt 303 (whole surface belt) starts its backward rotation, so that the leading edge of the partition sheet 400A reaches the right end of the platen glass 300 through the sheet passages (B) and (D).

7. The second sensor S2 detects the trailing edge of the partition sheet 400A. When a predetermined number of clockpulses are produced from the detection, the rotations of the belt 303 and the roller 15 are reversed. At this time, the trailing edge of the partition sheet 400A has passed by the deflecting guide 9. Then, the partition sheet 400A is introduced into the passage (C) through the passage (B) and is discharged by the rollers 15 and 17 onto the discharge tray 14. The belt 304 may be stopped when the partition sheet 400A is gripped by the rollers 15 and 17.

During the operation of those steps, the information marked on the partition sheet 400A is read by the second sheet sensor, and the operating mode and condition are determined for the waiting set of originals. It should be noted that the width of the marking is the same as the width of the second sheet sensor S2 so as to allow the second sensor S2 to read the marking.

8. When a predetermined number of clockpulses are produced from the third sensor S3 detecting the trailing edge of the partition sheet 400A, the motor 21 stops. By this, the complete passage of the sheet through the nip between the roller 15 and 17 is assured.

9. Then, the bottommost original (4) is fed (the original indicated by circles "4" in FIG. 6), by repeating the above described steps 2–6.

10. By the rotation of the belt 303, the original (4) is introduced into the space (E) between the platen 304 and the belt 303, and is then passed through the passages (F)–(H)–(I)–(J)–(inversed)–(K)–(L)–(inversed)–(N)–(H)–(F), in this order. As a result, the original (4) is set on the platen 304 with its front surface facing down.

11. The image forming apparatus starts its image forming operation in the mode and/or under a condition or conditions selected by the information marked on the partition sheet 400A, and the original (4) is read. In the image forming apparatus, a copy sheet is fed out of a cassette or the like and receives an image corresponding to the original (4) at an image forming station, and is then discharged to a copy sheet discharge tray.

12. The original (4), after being read, is conveyed through the passages (H)–(I)–(J), in this order and is then stacked on the tray 301 face up.

13. Each of the originals (3), (2) and (1) are conveyed through the passages (A)–(B)–(D)–(E)–(F)–(H)–(I)–(J)–(inversed)–(K)–(L)–(inversed)–(M)–(H)–(F)–(read)–(H)–(I)–(J), in this order, and they are sequentially stacked on the tray 301 face up. Thus, the leading of the originals (1)–(4) is completed for the first time.

14. Then, the original (4) in the tray 301 is separated by the separating device 302 and is conveyed through the passages (G)–(F)–(read)–(H)–(I)–(J) tray 301, in this order.

15. The same processing is repeated for the originals (3), (2) and (1), in this order.

16. The above described steps 14–15 are repeated for a desired number of times.

17. In the last cycle, the original is conveyed through the passages (G)–(F)–(read)–(H)–(I)–(J)–(inversed)–(K)–(L)–(inversed)–(M)–(H)–(F)–(E)–(D)–(B)–(C), in this order. Finally, the originals are discharged onto the tray 14 face up, thus completing the processing of the set D1 of the originals.

The above described operation is performed when plural copies are to be taken from a single original. When only one copy is needed, the original (4) is processed through the steps 1–11, and then the original is conveyed through the passages (H)–(I)–(J)– (K)–(L)–(M)–(H)–(F)–(E)–(D)–(B)–(C). Finally, it is received by the tray 14 face up.

Subsequently, the originals (3), (2) and (1) are sequentially conveyed through the passages (A)–(B)–(D)–(E)–(F)–(H)–(I)–(J)–(K)–(L)–(M)–(H)–(F)–(read)–(H)–(I)–(J)–(K)–(L)–(M)–(H)–(F)–(E)–(D)–(B)–(C)–, in this order. Finally, those originals are received by the tray 14 face up, thus completing the processing of the set D1 of the originals.

The last original of the set D1 of the originals is known by the document feeder, since the partition sheet 400A has information representing the number of the originals in the set.

Processing a set D2 of duplex originals

1. The last original of the set D1 of the originals, that is, the original (1) is discharged onto the tray 14, the partition sheet 400B is introduced through the steps 2–7 described with respect to the simplex originals. The mode or conditions marked on the partition sheet 400B is read, and thereafter, the partition sheet 400B is discharged onto the tray 14.

2. The bottommost original (the original indicated by "2" in a square in FIG. 7) of the set D2 of the originals is fed out with its page 4 (last page) facing down.

3. The belt 303 rotates to convey the original in the space (E) between the platen 304 and the belt 303. The original is conveyed through the passages (A)–(B)–(D)–(E)–(F)–, in this order, and is set on the platen 304 with its page 4 face down.

4. When the original [2] is set, the image forming operation starts in the mode and/or under conditions set by the partition sheet 400B, so that the page 4 of the original [2] is read. A copy sheet is fed from a cassette, and at an image forming station, page 4 of the original is copied on one side of the copy sheet. Then, the copy sheet is transported and temporarily accommodated in an intermediate tray.

5. After page 4 of the original [2] is read, the original is conveyed through the passages (H)–(I)–(J)–(inversed)–(K)–(L)–(inversed)–(M)–(H)–(F), in this order. As a result, the original [2] is set again on the platen 304, but with its page 3 face down, this time.

6. Then, the page 3 is read, while the copy sheet is conveyed from the intermediate tray and is introduced to the image forming station to receive a copy image of page 3 of the original [2] on the side thereof other than the side already having the image (page 4).

7. Then, the original [2] is conveyed through the passages (F)–(G) and is received by the tray 301 with its page 3 face up.

8. Then, an original [1] is processed through the passages (A)–(B)–(D)–(E)–(F)–(page 2 is read)–(H)–(I)–(J)–(inversed)–(K)–(L)–(inversed)–(M)–(H)–(F)–(page 1 is read)–(H)–(I)–(J), in this order. As a result, the original [1] is received by the tray 301 with its page 1 face up. Thus, one reading is completed for the respective sides of the originals [1] and [2].

9. The original [2] on the tray 301 is separated by the separating device 302 and is conveyed through the passages (G)–(F)–(H)–(I)–(J)–(inversed)–(K)–(L)–(inversed)–(M)–(H)–(F)–(page 4 is read)–(H)–(I)–(J)–(inversed)–(K)–(L)–(inversed)–(M)–(H)–(F)–(page 3 is read)–(H)–(I)–(J), in this order. Then, the original [2] is received by the tray 301.

10. The same processing is performed for the original [1].

11. The above steps 9 and 10 are repeated for a predetermined number of times.

12. In the last cycle, the original [1] or [2] is conveyed through the passages (G)–(F)–(H)–(I)–(J)–(inversed)–(K)–(L)–(inversed)–(M)–(H)–(F)–(page 2 or page 4 is read)–(H)–(I)–(J)–(inversed)–(K)–(L)–(inversed)–(M)–(H)–(F)–(page 1 or 3 is read)–(H)–(I)–(J)–(inversed)–(K)–(L)–(inversed)–(M)–(H)–(F)–(E)–(D)–(B)–(C), in the order named. Finally, the originals are received by the tray 14 with their odd number pages face up. Thus, the processing of the set D2 of the duplex originals is completed.

The above described operation is for producing a plurality set of copies from a single set of copy. When only one set of copies is required, the original [2], after its page 4 is read in the above described manner, is conveyed through the passages (H)-(I)-(J)-(inversed)-(K)-(L)-(inversed)-(M)-(H)-(F)-(page 3 is read)-(H)-(I)-(J)-(K)-(L)-(M)-(H)-(F)-(E)-(D)-(B)-(C), in this order. As a result the original is received by the tray 14. Then, the original [1] is conveyed and processed in the same manner. More particularly, it is conveyed through the passages (A)-(B)-(D)-(E)-(F)-(page 2 is read)-(H)-(I)-(J)-(inversed)-(K)-(L)-(inversed)-(M)-(H)-(page 1 is read)-(H)-(I)-(J)-(K)-(L)-(M)-(H)-(E)-(D)-(B)-(C)-(tray 14), in this order. The processing of the set D2 of the originals is completed for a single set of copy.

When all the originals in the sets D1 and D2 have been processed, the first sensor S1 detects the absence of the originals on the tray 1. Thus, all the processing is completed. The originals after being processed are discharged on the discharge tray 14, wherein the order of the pages of the originals is the same as those when it is first set on the tray 1, and therefore, it is not necessary to correct the page order. Also, the produced copies are discharged in the same order as that of the originals set on the tray 1, and therefore, the operation is very efficient.

In this embodiment, the partition sheets 400A and 400B are effective to set the copying mode for the following set of the originals. However, the copying mode may be set on an operation panel (not shown) of the copying apparatus by key input or the like. In this case, the partition sheet or sheets simply indicated a partition between adjacent sets of originals.

Figure 7:
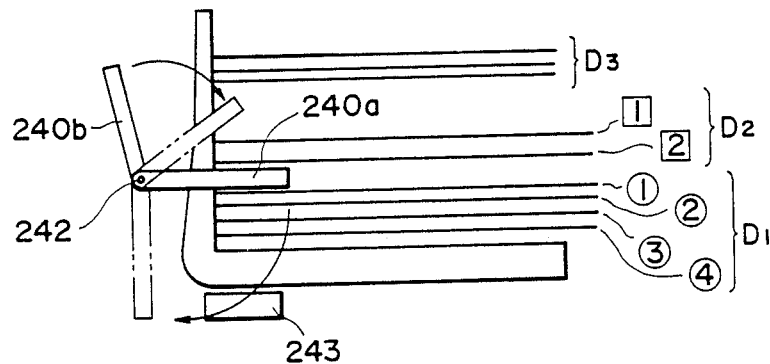
FIG. 7 is a front view of a partition lever.

FIG. 7 shows another example of a mechanism for detecting the boundary between adjacent sets of originals without use of the partition sheets 400 and the sensor S2. As shown in FIG. 7, a plurality of levers 240 are rotatably mounted on a lever shaft 242 which is mounted to a rear wall of the stacking tray 1. For the sake of simplicity of explanation, it is assumed that only three levers 240a, 240b and 240c are used. The levers are normally suspended as shown by broken lines in this Figure. To the bottom surface of the tray 1, a sensor 243 is mounted at such a position that its sensable path intersects a plane of rotation of the levers.

The operation of this device will be described, assuming that the sets of originals shown in FIG. 6 are to be copied. The copying modes for the respective sets D1 and D2 of originals are set by keys or the like on the operation panel (not shown) of the copying apparatus. The levers 240a, 240b and 240c are inserted, corresponding to the respective sets D1 and D2 of originals.

When an unshown start button is depressed, the above described steps are executed for the set D1 of originals. When the last original (1) of the set D1 is fed out, the lever 240a having been supported by that original becomes not supported, so that it is suspended as shown by the broken lines. During this movement of the lever 240a, it crosses the optical sensing path of the sensor 243, so that the sensor detects the termination of the feeding of the first set originals D1.

After completion of copying the D1 originals, the copying apparatus is switched to the copying mode preset for the second sets D2 of the originals, and the set D2 of originals is processed.

When some set of originals is being processed, another set D3 of originals may be placed on the existing originals. In doing this, the lever 240b is first placed on the original set D2 by rotating it, and then the additional set D3 of the originals is placed. The copying mode for the additional set of originals may be set in the copying apparatus without waiting for termination of the processing of the original set D2, as if a reservation is made.

The separating means 302 of the circulation type original feeding station B is essentially the same as the separating means 5 and 7 in the original setting or feeding station A. Therefore, if the reservation is not required, the originals are set on the tray 301 with first page face up, usual copying operation can be performed. More particularly, the originals are circulated through the passages (G)-(F)-(reading)-(H)-(I)-(J)--tray 301, in this order when the originals are simplex originals. When the originals are duplex originals, they are conveyed through the passages (G)-(F)-(H)-(I)-(J)-(K)-(L)-(M)-(H)-(once side is read)-(H)-(I)-(J)-(K)-(L)-(M)-(H)-(F)-(the other side is read)-(H)-(I)-(J)-tray 301, in this order.

Figure 9:
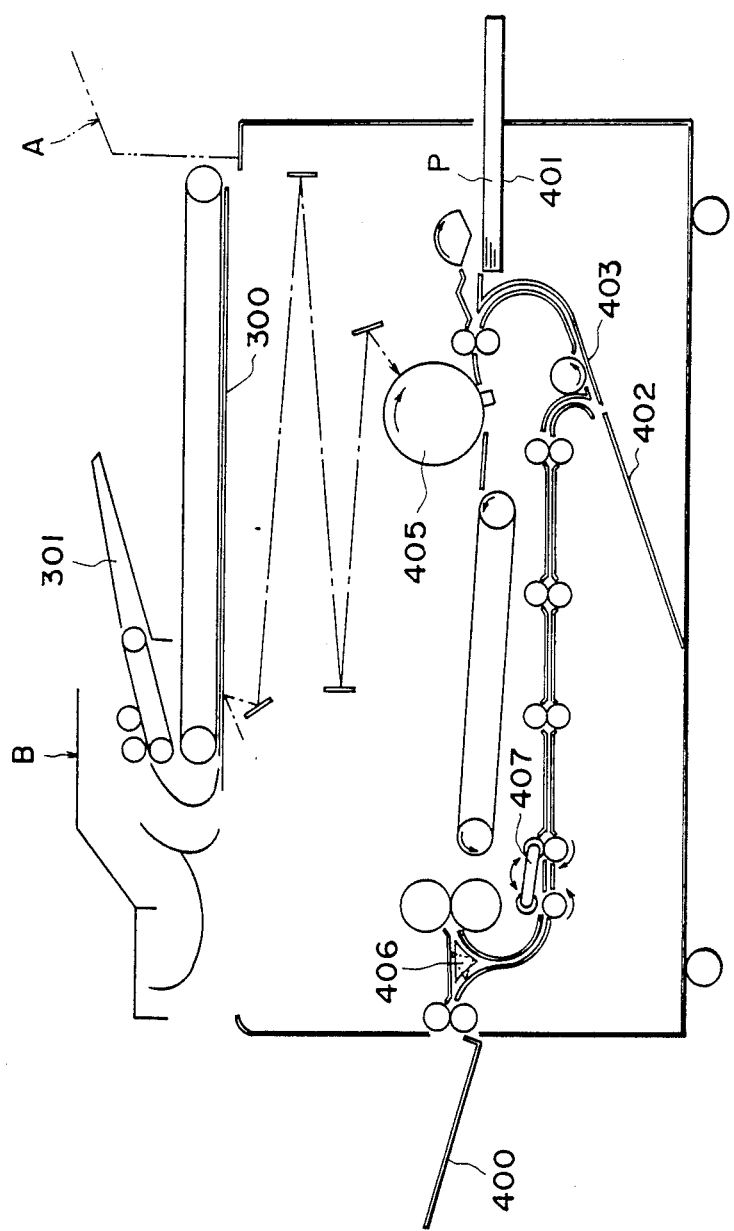
FIG. 9 is a sectional view of an image forming apparatus equipped with an automatic document feeder according to an embodiment of the present invention.

FIG. 9 is a schematic cross-section of an image forming apparatus equipped with an automatic document feeder according to the above-described embodiment of the present invention. In this Figure, the passages for the copy sheets are mainly illustrated. The image forming apparatus comprises a photosensitive drum 405 to which an image of an original supported on the platen glass is projected by way of the optical path indicated by chain lines in this Figure. The photosensitive member is rotatable in the direction indicated by an arrow, and the image formed on the photosensitive drum 405 is transferred onto the copy sheet which is conveyed by a copy sheet conveying mechanism. The mechanism includes a cassette 401 for accommodating copy sheets P, an intermediate tray 402, a deflector 406, switchback means 407.

In the simplex copy operation, the copy sheet P is fed out of the cassette 401 to the photosensitive drum 405, where it receives on its one side an image of the original and is conveyed to a fixing means, where the image thereon is fixed. The copy sheet is then discharged to a discharge tray 400 by a deflector 406 taking the solid line position.

In the duplex copy operation the copy sheet having received on its one side the image is not discharged to the discharge tray 400, but is guided to the intermediate tray 402 by the deflector 406 which takes the broken line position. Then, the copy sheet on the intermediate tray 402 is again fed out by the roller 403 and is fed to the photosensitive drum 405. It is noted that at this time, the copy sheet has been inverted in its facing orientation, so that the backside not having the image, of the copy sheet is faced to the photosensitive drum. The copy sheet receives the image, which is then fixed by the fixing means, whereby a duplex copy is produced, which is then discharged to the discharge tray 400 by the deflector 406 taking the solid line position.

Figure 11A:
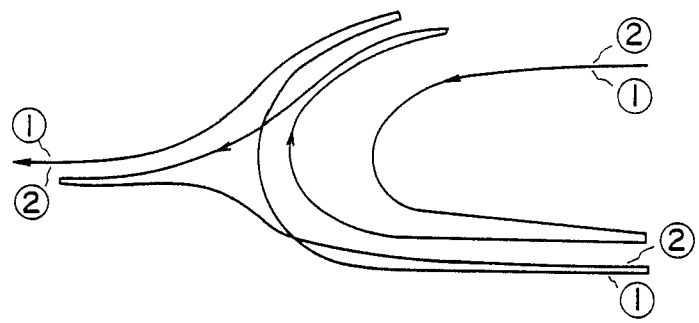
FIG. 11A is a schematic view illustrating movements of a duplex original in an operation for producing a duplex copy from the duplex original.

FIG. 11A illustrates movement and orientation of a duplex original being processed, wherein the circled numerals indicate pages of the original. As will be understood, the second page is first read, and subsequently, the first page is read.

Figure 11B:
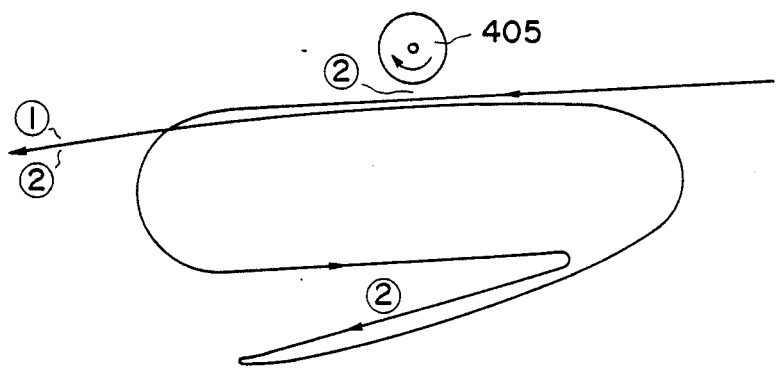
FIG. 11B is a schematic view illustrating movements of a copy sheet in the same operation.

FIG. 11B illustrates movement of a copy sheet, corresponding to the movement of the original shown in FIG. 11A. The image of the original is receives from the photosensitive drum 405. As will be understood, the first side of the copy sheet first receive the second page image of the original, and then the second side of the copy sheet receives the first page original image, and the copy sheet is discharged with its first page face up.

Figure 11C:
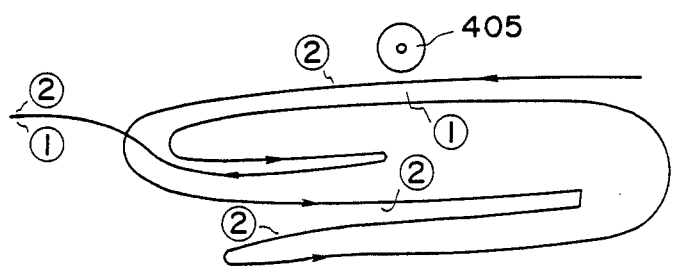
FIG. 11C is a schematic view illustrating another example of movements of the copy sheet.

FIG. 11C shows another example of the operation for conveying the copy sheet, wherein the movement of the copy sheet is the same as in FIG. 11B until its second side receives the image. However, the copy sheet is not discharged directly, and is switched back by the switch back mechanism 407 before it is discharged to the discharge tray 400, so that the copy sheet has the same facing orientation as the original before and after the copy, as will be understood when compared with FIG. 11A.

Figure 12A:
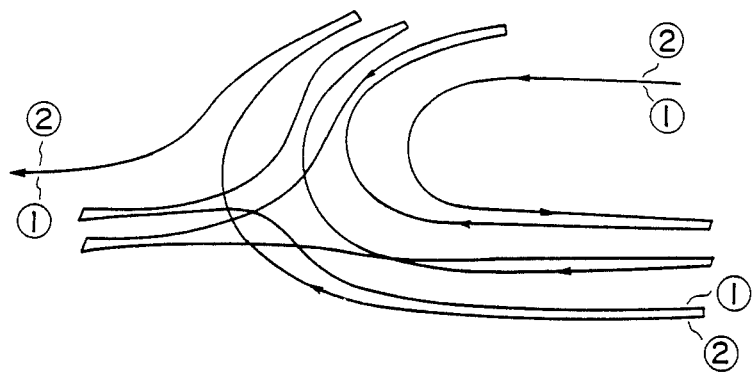
FIG. 12A is a schematic view illustrating another example of movements of the original in the same operation.
Figure 12B:
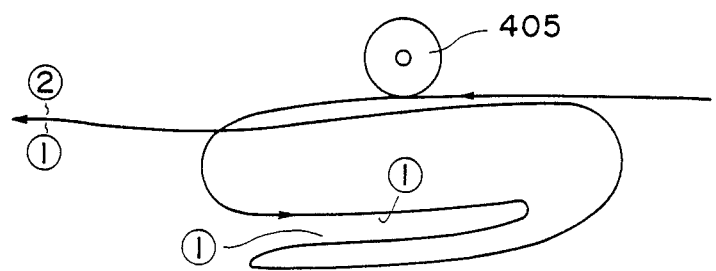
FIG. 12B is a schematic view illustrating movements of a copy sheet in the operation of FIG. 12A.

FIG. 12A shows another example of original movement, and FIG. 12B illustrates the corresponding movement of the copy sheet. As will be understood, when the original is first placed onto the platen, it is not read, but it is inverted and then its first page is first copied, and then the second page thereof is copied. That is, although the second page of the original is first placed in a readable position, but it is not read. By doing so, the facing orientation of the discharged copy sheet is the same as the original although the movement of the copy sheet is the same as in FIG. 11B.

In the foregoing embodiment, the copy sheets are discharged on the tray 400. In order to discharge the copy sheets in the correct page order, each of the originals is recirculated by the circulation type original feeding station B when plural sets of copies are to be produced. However, if a known sorter is employed in place of the tray 400, more efficient operation is possible. Additionally, if the circulation type original feeding station B is used with the sorter, efficient processing is possible even if the required number of sets of copies is larger than the number of bins of the sorter.

When the sorter is used, and a plurality of sets of copies are to be produced, the originals are moved in the following manner. It is assumed that duplex copy is to be produced from duplex originals. After one side of an original is read, the original is conveyed through the passage (H)-(I)-(J)-(K)-(L)-(M)-(H)-(F), and is placed on the platen 300, again so that the other side thereof is read. The duplex copy sheet produced in association with the above described movement of the original, is discharged onto the first bin. Subsequently, the first side of the same original is placed face down on the platen 300 and is read, and then the second side is placed on the plate 300 face down. Correspondingly, a second duplex copy of the same original is produced and is discharged onto the second bin of the sorter. These operations are repeated the required number of times and only then the original is discharged to the tray 14. The next original is subjected to the same operation. As will be understood, the original is not conveyed to the tray 301.

Another operation is possible. For example, when one side of an original is placed on the platen 300 face down, it is read a required number of times, by which the number of simplex copies are produced and are received temporarily by the intermediate tray 402. Then, the original is, inverted in its facing orientation so that the other side of the original is placed on the platen 300 face down and is read. The read image is reproduced on the other sides of the simplex copy sheets which are fed from the intermediate 402 and are inversed. Then, the required number of duplex copy sheet having the same images are sequentially produced, which are received by the first bin of the sorter. In this case, the original is not conveyed to the tray 301, but is directly discharged to the tray 14.

Figure 10:
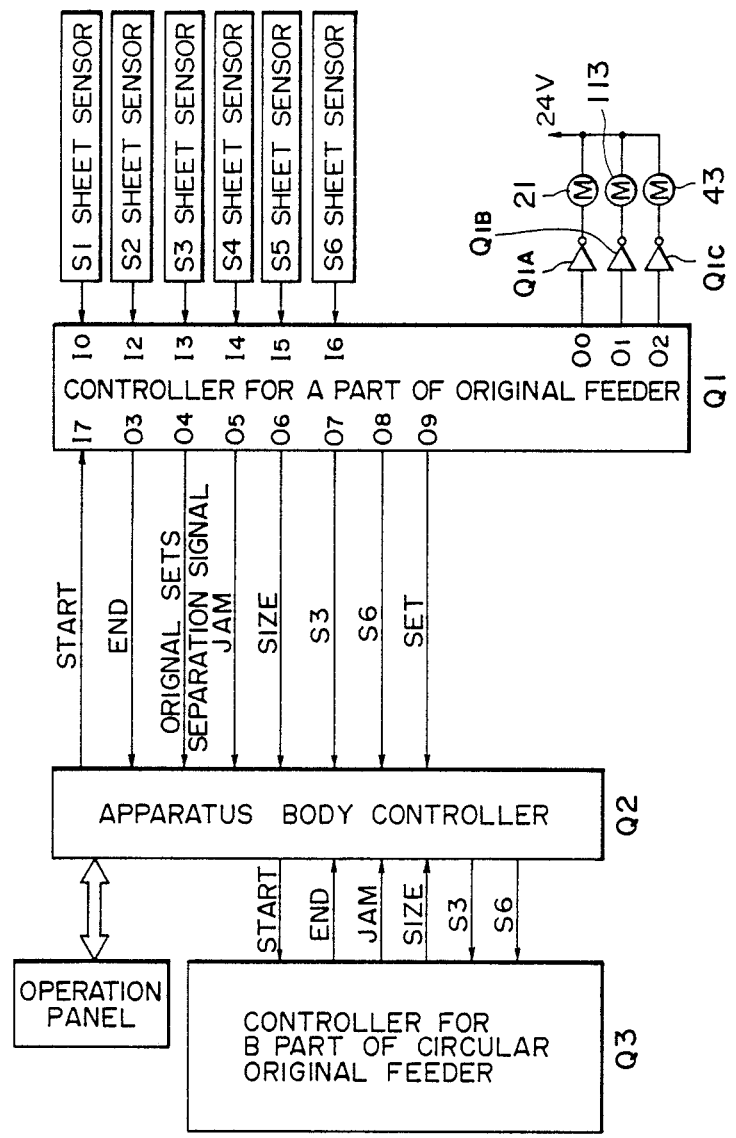
FIG. 10 is a block diagram of a control system for the image forming apparatus.

FIG. 10 is a block diagram of the invention for performing the control of various parts for executing the above described operations. The control system comprises a first controlling section Q1 for the original feeding or setting station A, a second control section Q2 for controlling the image forming apparatus or the copying apparatus and a third control section Q3 for controlling the circulation type original feeding station B. Those control sections contain microcomputers including ROM (read only memory) and RAM (random access memory), I/O latches, formed into LSI. The system contains the input ports I0–I7 and output ports, drivers $Q_{1A}$, $Q_{1B}$ and $Q_{1C}$ constituted by transistors or the like. The input ports I0–I6 receive signals from sheet sensors S1–S6. The output ports O1–O2 produce signals for operating the conveying motor 21, the driving motor 113 and the plunger 43. The input port I7 and output ports O3–O9 are used for communication with the copying apparatus. The input port I7 receives a start signal from the copying apparatus. The output ports O3–O9 produces outputs to the copying apparatus signals representing a size of the originals, existence of the partition between sets of originals, and the presence or absence of the originals.

As for the partition sheet for indicating the boundary between different sets of originals, the partition sheet itself may have the information of the copying mode for the subsequent set of the originals. In this case, marks different depending on the copying modes are recorded on the surface of the partition sheet, which is read by the sensor S2, and the read mode signal is transmitted to the control section Q2.

As described in the foregoing, the partition between adjacent sets of originals may be replaced by a rotatable levers.

While the invention has been described with reference to the structures disclosed herein, it is not confined to the details set forth and this application is intended to cover such modifications or changes as may come within the purposes of the improvements or the scope of the following claims.

What is claimed is:

1. An automatic document feeder, comprising:
 a reserved original feeding station including:
  first stacking means for stacking originals including a plurality of sets of originals;
  means for detecting the boundary between the plurality of sets of originals;
  first feeding means for feeding, one by one, the originals stacked on said first stacking means;
  first conveying means for conveying the originals without inversion, fed by said first feeding means, to a processing station; and
  means for receiving the originals discharged from the processing station;
 a circulation type original feeding station including:
  second stacking means for stacking the originals;
  second feeding means for feeding, one by one, the originals stacked on said second stacking means;
  second conveying means for conveying to the processing station the originals fed by said second feeding means;
  inverting means for receiving the originals from the processing station, inverting the originals so that the direction in which the originals face is inverted and conveying the originals to the processing station; and returning means for returning the originals to said second stacking means, and control means for controlling said reserved original feeding station and said circulation type original feeding station to feed an unprocessed original from said reserved original feeding station to the processing station after inverting said unprocessed original with said inverting means.

2. A feeder according to claim 1, wherein said reserved original feeding station and said circulation type original feeding station are disposed on the opposite sides of the processing station.

3. A feeder according to claim 1, wherein said first conveying means extends substantially straight.

4. A feeder according to claim 1, wherein the processing station includes a platen glass and belt means, between which the original may be conveyed by the belt means.

5. A feeder according to claim 4, wherein the belt means is reversible.

6. An automatic document feeder, comprising:
a reserved original feeding station including:
  first stacking means for stacking originals including a plurality of sets of originals;
  means for detecting the boundary between the plurality of sets of originals;
  first feeding means for feeding, one by one, the originals stacked on said first stacking means;
  first conveying means for conveying the originals without inversion, fed by said first feeding means, to a processing station; and
  means for receiving the originals discharged from the processing station;
a circulation type original feeding station including:
  second stacking means for stacking the originals;
  second feeding means for feeding, one by one, the originals stacked on said second stacking means;
  second conveying means for conveying to the processing station the originals fed by said second feeding means;
  inverting means for receiving the originals from the processing station, inverting the originals so that the direction in which the originals face is inverted and conveying the originals to the processing station; and
  returning means for returning the originals to said second stacking means; and
control means for controlling said reserved original feeding station and said circulation type original feeding station to feed an unprocessed original from said reserved original feeding station to the processing station after inverting said unprocessed originals with said inverting means and to return the processed originals to said receiving means after circulating said processed original through said second feeding means and said second conveying means.

7. A feeder according to claim 6, wherein said reserved original feeding station and said circulation type original feeding station are disposed on opposite sides of the processing station.

8. A feeder according to claim 6, wherein said first conveying means extends substantially straight.

9. A feeder according to claim 6, wherein the processing station includes a platen glass and belt means, between which the originals may be conveyed by the belt means.

10. A feeder according to claim 9, wherein the belt means is reversible.

* * * * *

UNITED STATES PATENT AND TRADEMARK OFFICE
CERTIFICATE OF CORRECTION

PATENT NO. : 4,819,023
DATED : April 4, 1989
INVENTOR(S) : MAKOTO KITAHARA

It is certified that error appears in the above-identified patent and that said Letters Patent is hereby corrected as shown below:

COLUMN 1

Line 51, "image," should read --image--.
Line 56, "sets copies" should read --sets of copies--.
Line 67, "the conditions" should read --under the conditions--.

COLUMN 4

Line 25, "sheet sensor S1dis-" should read --sheet sensor S1 is dis- --.

COLUMN 6

Line 38, "to" should be deleted.

COLUMN 7

Line 53, "square-parenthesized "☐"" should read --square-parenthesized "[ ]"--.

COLUMN 9

Line 33, "leading" should read --reading--.

COLUMN 10

Line 10, "original" (first occurrence) should read --original [2]--.

UNITED STATES PATENT AND TRADEMARK OFFICE
CERTIFICATE OF CORRECTION

PATENT NO. : 4,819,023
DATED : April 4, 1989
INVENTOR(S) : MAKOTO KITAHARA

Page 2 of 2

It is certified that error appears in the above-identified patent and that said Letters Patent is hereby corrected as shown below:

COLUMN 12

Line 16, "-(once" should read -- -(one--.
    Line 63, "receives" should read --received--.
    Line 65, "receive" should read --receives--.

COLUMN 13

Line 59, "is," should read --is--.

Signed and Sealed this

Twenty-second Day of October, 1991

Attest:

HARRY F. MANBECK, JR.

*Attesting Officer*    *Commissioner of Patents and Trademarks*